US012613818B2

(12) United States Patent
Shelley et al.

(10) Patent No.: US 12,613,818 B2
(45) Date of Patent: Apr. 28, 2026

(54) HARDWARE INTEGRATED QUALITY OF SERVICE (HiQoS)

(71) Applicant: NXP USA, INC., Austin, TX (US)

(72) Inventors: Gareth Owen Shelley, San Jose, CA (US); Maciej Krawczyk, San Jose, CA (US); Paul Michael Burns, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 118 days.

(21) Appl. No.: 18/475,484

(22) Filed: Sep. 27, 2023

(65) Prior Publication Data

US 2025/0103526 A1      Mar. 27, 2025

(51) Int. Cl.
G06F 13/20          (2006.01)
G06F 1/04           (2006.01)
G06F 13/24          (2006.01)

(52) U.S. Cl.
CPC ............... G06F 13/20 (2013.01); G06F 1/04 (2013.01); G06F 2213/40 (2013.01)

(58) Field of Classification Search
CPC ............................... G06F 21/85; G06F 30/327
See application file for complete search history.

(56) References Cited

U.S. PATENT DOCUMENTS

| | | | |
|---|---|---|---|
| 6,976,109 B2 | 12/2005 | Shenderovich | |
| 7,127,540 B2 | 10/2006 | Lee | |
| 7,395,361 B2 | 7/2008 | Schaffer et al. | |
| 8,732,378 B2 | 5/2014 | Nakazono et al. | |
| 9,594,592 B2 * | 3/2017 | Challa ................... | G06F 9/5011 |
| 9,600,339 B2 * | 3/2017 | Challa ................... | G06F 9/5011 |
| 10,237,169 B2 | 3/2019 | Bernat et al. | |
| 10,534,641 B2 * | 1/2020 | Obara ...................... | G06F 9/48 |
| 2016/0210260 A1 | 7/2016 | Case et al. | |
| 2018/0075258 A1 * | 3/2018 | Circello ................. | G06F 21/85 |
| 2019/0340313 A1 * | 11/2019 | Adler ................... | G06F 30/327 |
| 2021/0011872 A1 | 1/2021 | Thompson et al. | |

OTHER PUBLICATIONS

U.S. Appl. No. 18/067,446, Shelley, et al.: "Hardware Integrated, Priority-Encoded Domains", filed Dec. 16, 2022.

* cited by examiner

*Primary Examiner* — Getente A Yimer

(57)          ABSTRACT

Systems and methods for hardware integrated Quality of Service (HiQoS) are discussed. In some embodiments, an electronic device may include a chassis; and a Systems-on-Chip (SoC) disposed within the chassis, wherein the SoC comprises an extended Resource Domain Controller (XRDC) configured to block a transaction originated from a selected one of a plurality of software-defined processing domains before the transaction reaches a bus.

20 Claims, 12 Drawing Sheets

FIG. 4A

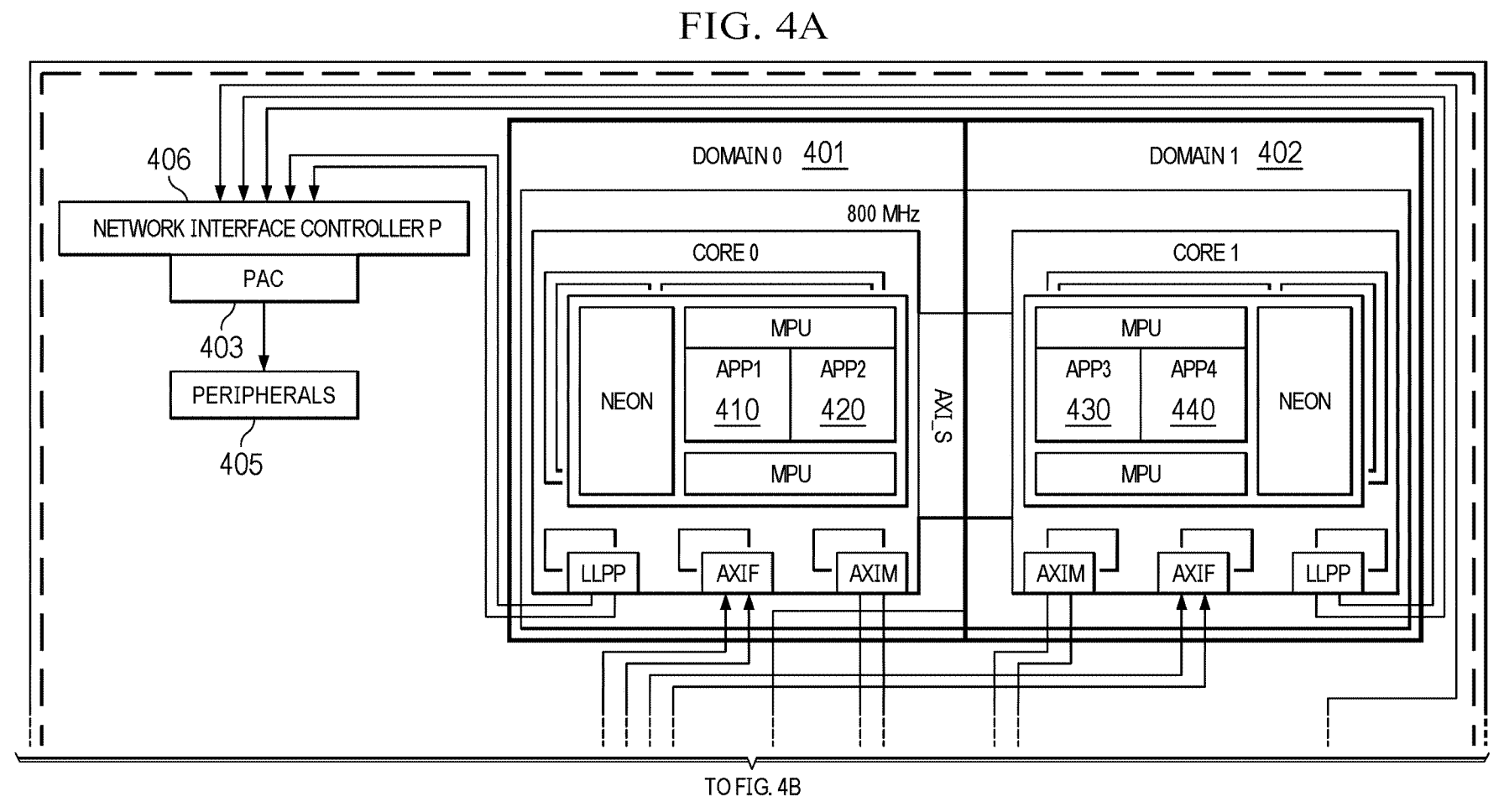

DOMAIN 1 402

CORE 1

NEON

MPU

APP3 430

APP4 440

MPU

LLPP

AXIF

AXIM

AXI_S

DOMAIN 0 401

800 MHz

CORE 0

MPU

APP1 410

APP2 420

MPU

NEON

AXIM

AXIF

LLPP

NETWORK INTERFACE CONTROLLER P

PAC

403

PERIPHERALS

501B — MASTER ISSUES TRANSACTION

502B — MDAC ADDS DID/SEC/PRIV

503B — DID BLOCKED?

504B — TRANSACTION ON THE BUS

NO

YES

505B — BLOCK TRANSACTION

CCE = 1 AND NCYCLES REACHED?

506B

NO

YES

507B — CLEAR DID

700A

HARDWARE INTEGRATED QUALITY OF SERVICE (HiQoS)

FIELD

This disclosure relates generally to electronic circuits, and more specifically, to systems and methods for Hardware integrated Quality of Service (HiQoS).

BACKGROUND

An Integrated Circuit (IC) is a set of electronic circuits fabricated on a piece of semiconductor material (e.g., silicon). With the advent of modern semiconductor manufacturing techniques, an ever-increasing number of miniaturized transistors and other electronic components may now be integrated into a single electronic package or chip. For example, a modern System-on-Chip (SoC) includes most (or all) components of an entire computer or data processing system.

In a modern SoC, resources such as processing cores, memories, and peripherals may be grouped together into so-called "resource domains." For instance, such an SoC may include a Resource Domain Controller (RDC) module configured to support the isolation of destination memory-mapped locations, such as peripherals and memory, to a selected core (or bus master).

In more advanced implementations, however, instead of RDCs, SoCs may include extended Resource Domain Controllers (XRDCs). An XRDC is a configurable module that allows the creation of software-defined processing domains within an SoC, which are enforced by hardware.

Within an SoC equipped with XRDC, each bus master may have its own Master Domain Assignment Controller (MDAC) register set programmed with certain attributes. These attributes are added to all transactions originated from a bus master and checked at the memory, by a Memory Region Controller (MRC), or at the peripheral, by a Peripheral Domain Access Controller (PDAC), to ensure that these transactions meet any applicable requirements.

BRIEF DESCRIPTION OF THE DRAWINGS

The present invention(s) are illustrated by way of example and are not limited by the accompanying figures, in which like references indicate similar elements. Elements in the figures are illustrated for simplicity and clarity and have not necessarily been drawn to scale.

FIGS. 4A and 4B are block diagrams of an example of a Systems-on-Chip (SoC) having components grouped into software-defined processing domains, according to some embodiments.

DETAILED DESCRIPTION

In various embodiments, systems and methods for Hardware integrated Quality-of-Service (HiQoS) are described. In some implementations, systems and methods described herein may be used to ensure that a given software-defined domain within a processing system, such as a Systems-on-Chip (SoC), does not consume excessive bus bandwidth (e.g., so that other transactions originated by other domains, such as safety-critical domains, do not stall).

These systems and methods may also be used to ensure that a software-defined processing domain does not consume excessive bandwidth of a peripheral or memory (e.g., to limit the impact of code stuck in a loop attempting to access a memory or peripheral repeatedly). As such, HiQoS may be implemented to guarantee, for example, that: a particular domain does not use excessive bandwidth on the SoC's bus, another domain has unlimited access to the bus at a certain point in time, etc.

Figure 1:
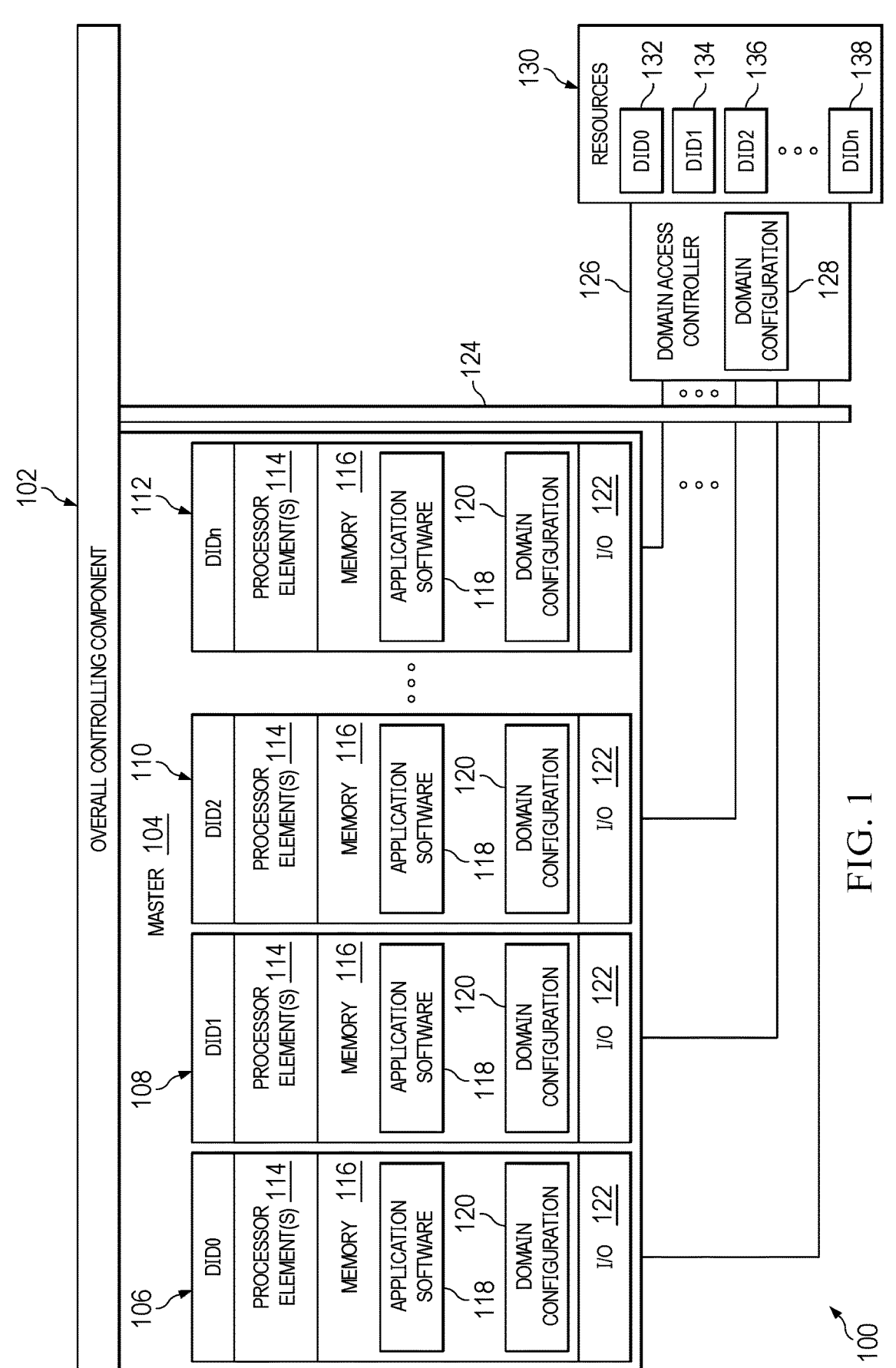
FIG. 1 is a block diagram of an example of a processing system, according to some embodiments.

To illustrate the foregoing, FIG. 1 is a block diagram of an example of processing system 100. In this embodiment, processing system 100 includes an overall controlling component (such as a hypervisor, Operating System or "OS," etc.) 102 and master device 104. Master device 104 includes two or more processing elements 106-112 configured to execute software components 118 (such as virtual machines or applications).

Processing elements 106-112 may include all or at least a portion of processor element or core 114, input/output (I/O) circuitry 122, and memory 116 configured to store (i) application or virtual machine software 118, and (ii) domain configuration information 120. Overall controlling component 102 may be connected directly or indirectly to interconnect, cross-switch, switch fabric, crossbar, or bus 124 to communicate with domain access controller 126.

Domain access controller 126 is coupled to resources 130. Each of resources 130 may be assigned a Domain IDentifier (DID) as a member of one of resource subgroups 132-138, according to the domain of software components (such as virtual machines or "VMs," applications, etc.) executed by processing resources 106-112, with which resources 130 are associated. Domain assignments for these software components may be stored in memory 116, as one or more files containing domain configuration information 120.

In operation, certain parameters may be communicated between overall controlling component 102 and domain access controller 126 via interconnect 124, such as: DIDs, peripheral addresses, access attributes such as secure/non-secure attributes, etc. Interconnect 124 also routes requests and responses between processing components 106-112 and domain access controller 126.

Overall controlling component 102 may create one or more processing components 106-112 within processing system 100. Processing components may include private execution environments run by overall controlling component 102 and may be referred to as "domains."

In the case of VMs, each of processing components 106-112 may run a different OS concurrently on processing system 100. Overall controlling component 102 may be implemented in hardware or in software that runs directly on hardware resources such as processor elements 114, memory 116, and I/O interface circuitry 122.

In the case of VMs, one of processing components 106-112 may be a control domain that runs a full instance of an OS, and each of the other domains may be a guest domain that run a full instance of another OS; which may be different from the OS running on the control domain (or the other guest domains).

Overall controlling component 102 partitions, shares, manages, and monitors the hardware resources and acts as an interface between hardware resources and domains. As such, overall controlling component 102 performs low-level operations required to provide either an OS or a virtualized platform. The control domain may perform all other tasks. For example, the control domain may determine which guest domains are created, which resources each guest domain may access, and how much memory is allocated to each guest domain.

In addition, overall controlling component 102 may include a scheduler that schedules domains or applications onto processor elements 114. Each domain, including the control domain, may include one or more virtual processors that it owns and does not share with other domains. Overall controlling component 102 may be integrated with a bootloader or work in conjunction with the bootloader to help create the processing components 106-112 during boot.

System firmware may start the bootloader using a first processor element. The bootloader may load domain configuration 120, kernel images and device trees from a boot partition in memory 116 for processing components. Overall controlling component 102 may then communicate domain information to domain access controller 126 before any of processing components 106-112 is configured and begins its operations.

Using overall controlling component 102 to supply domain configuration information 120 directly to domain access controller 126 before processor elements 114 start executing reduces the opportunity for domains to be corrupted accidentally or intentionally.

In addition, once domain access controller 126 receives information such as domain identifiers for each resource, domain access controller 126 may determine whether domain identifiers for the sender and receiver match before passing a message along to the receiver.

Domain access controller 126 may check the domain identifiers for messages being received by resources 130 as well as messages being sent by resources 130. The ability to match domain identifiers for messages being sent from resources 130 also helps prevent corruption of processing components 106-112. In addition to domain identifiers, domain access controller 126 may also check other domain configuration information 120 such as access rights, to determine whether messages may be passed to and from resources 130.

Once overall controlling component 102 shares domain configuration information 120 with domain access controller 126, overall controlling component 102 may switch to an overall controlling component mode, initialize overall controlling component registers, and hand control over to a guest kernel. On the control core, overall controlling component 102 may then do the same for the guest that will run on the control core (i.e., initialize the data structures for the guest, switch to the overall controlling component mode, initialize overall controlling component registers, and hand off control to the guest kernel).

After bootup, the distinction between a primary core and a secondary core may be ignored and overall controlling component 102 may treat the two cores equally.

In some embodiments, master device 104 may be implemented using Systems-on-Chip (SoC) technologies that includes multiple processing cores (sometimes referred to as a "multi-core" processor). For example, master device 104 may be implemented using an SoC manufactured with an ARM architecture, or any other architecture.

Additionally, or alternatively, master device 104 may include a multi-core processor that is not an SoC to provide the same or a similar environment. For example, a multi-core processor may be a general computing multi-core processor on a motherboard supporting multiple processing cores. In further embodiments, master device 104 may be implemented using a plurality of networked processing cores. Additionally, or alternatively, master device 104 may be implemented using a cloud computing architecture or other distributed computing architecture.

Processor elements 114 may be virtualized elements that may each include one or more processing cores to perform calculations and general processing tasks, run application software 118, manage I/O interfaces 122, run OSs, etc. Note that a single processing core may be shared among processing components 106-112, and each processing component 106-112 may use more than one processing core.

Domains associated with processing components 106-112 may be configured for various purposes.

As a non-limiting example, in automobile applications, domain 106 may be used for a powertrain controller for resources that may include an engine, transmission, brakes, battery management system, steering, airbags, and suspension.

Domain 108 may be used for a body controller for resources that may include Heating, Ventilation, and Air Conditioning (HVAC), mirrors, interior lighting, doors, sears, steering wheel, sunroof, and windshield wipers. Domain 110 may be used for a cockpit controller for resources that may include touch displays and voice recognition amplifiers. And domain 112 may be used for a connectivity controller for resources that may include vehicle-to-everything, broadcast radio, cellular, WiFi, Bluetooth, near field communication, and smart car access components. Other domains may be implemented in processing system 100 for purposes other than automotive applications.

In various embodiments, any number or type of domains may be supported (e.g., two domains, three domains, five domains, eight domains, . . . sixteen domains, etc.) in addition to or in place of the four domains enumerated herein. In selected embodiments, two or more different OS environments may be provided (e.g., one for each of the domains). Each of the OS environments may be dedicated to a different core (or multiple cores) of a multi-core SoC. Any number or type of operating environments may be provided, and may be used for devices and equipment other than automobiles.

Memory devices 116 may include one or more random access memory (RAM) devices, such as double data rate (DDR) RAM module, quad serial peripheral interface (QUADSPI) memory, SoC RAM modules, graphics on-chip RAM module, boot read only memory (ROM) module, or other suitable memory devices.

Application software 118 may be stored in memory 116 that is internal to an SoC, or in a memory device external to master device 104, and loaded into internal memory devices 116 during startup. Various types of application software 118 may be used, depending on the operations to be performed by processing system 100.

To illustrate, in the automotive application example above, application software 118 may include various controllers for resources 130, such as a powertrain domain controller, body domain controller, cockpit domain controller, and connectivity domain controller. Other types of application software 188 may be used, however.

Domain configuration 120 may be used by overall controlling component 102 to set up processing components 106-112. Such information may include, for example: a number of processing components 106-112, physical core assignments to each VM 106-112, temporal behavior to limit temporal interferences of multiple processing components 106-112 with respect to each other, connections via inter-VM communication channels, access rights of processing components 106-112 to resources 130, domain identifiers for elements of processing components 106-112 and resources 130, priority information for processing components 106-112, and overall controlling component security features for master device 104 and domain access control device 126.

I/O circuitry 122 provides a connection between processing components 106-112 and resources 130. Within I/O circuitry 122, pins or terminals may be driven by pad drivers that provide for logic level translation, protection against potentially damaging static charges, and amplification of internal signals to provide sufficient current drive to be useful outside of master device 104. I/O circuitry 122 typically includes pads or pins connected to respective input pullup devices, electrostatic discharge protection, input buffers, level shifters, output drivers, and output pulldown devices. Other components may be included in I/O circuitry 122.

I/O circuitry 122 may be coupled to interconnect 124 either directly or through a network interface card. The connection between I/O circuitry 122, interconnect 124, and domain access control 126 may be wired or wireless. Any suitable interconnect technology may be used. For wired networks, an example of a suitable interconnect technology includes ETHERNET, which allows multiple processing components 106-112 to communicate with resources 130, and may be implemented using ETHERNET cables plugged into a switch, router, hub, network bridge, etc.

Messages sent to and from interconnect 124 may adhere to a protocol suitable for the interconnect technology being used. When using ETHERNET, for example, a stream of data may be divided into frames or packets, also referred to as messages, that each include source and destination addresses, a payload, and error checking data so that damaged frames may be discarded, and replacements retransmitted.

Domain access controller 126 sends and receives messages to and from master device 104 through interconnect 124. Upon receipt of a message, domain access controller 126 may extract data from the message including a destination address, DID, and access rights.

At domain access controller 126, if the DID and access rights in a message or transaction match the information in domain configuration information 128 for the resource corresponding to the destination address, the message or transaction may be routed to a corresponding one of resources 130. The information in domain configuration information 128 may be a subset of the domain configuration information 120 in master device 104.

In various implementations, domain access controller 126 may be centrally implemented for use by all resources 130. Alternatively, some or all of resources 130 may have their own domain access controller to check whether the DID and, optionally, access rights match. If the DID in a message does not match the domain identifier for a particular resource device 130, the message may be discarded (transaction blocked or aborted), or the message may be flagged and an alert may be sent to overall controlling component 102, one of processing components 106-112, or to a component external to processing system 100 for security or other purposes.

In some cases, domain access controller 126 may also use priority information 128 to prioritize particular higher-priority messages over other lower priority messages in accessing resources 130.

As resources 130 receive data from external sources, there is potential for the data to include malicious software or other components from an external device that may try to gain control of master device 104 through information sent from resources 130 to master device 104. Thus, in addition to checking DIDs and, optionally, access rights, of messages sent to resources 130 by master device 104, domain access controller 126 may also check whether there is a match between DIDs and, optionally, access rights, of messages sent from resources 130 to master device 104. In this manner, data cannot be sent from one domain in resources 130 to another domain in master device 104.

One or more resources 130 may send data to or receive data from portable media devices, data storage devices, servers, mobile phones, radios for AM, FM and digital or satellite broadcast, etc. These devices may be connected to resources 130 via a wire (e.g., through connector hardware such as USB connectors, firewire connectors, lightning connectors), or wirelessly (e.g., using infrared communication, BLUETOOTH communication, ZigBee communication, Wi-Fi communication, communication over a local area network or wireless local area network, etc.).

Some resources 130 may be connected to one or more video connectors for the transmission of video data between devices/sources and processing system 100. For example, a video connector may follow a standard such as High-Definition Multimedia Interface (HDMI), Mobile High-definition Link (MHL), etc. The video connector may implement a standard using auxiliary processors, integrated circuits, memory, a mobile Industry Processor Interface, etc.

Particularly in the example of automotive applications, one or more resources 130 may be connected to one or more Local Interconnect Networks (LIN) or Controller Area Networks (CAN) to allow communication between vehicle components. Vehicle sensors that may be included in resources 130 include, but are not limited to, gyroscopes, accelerometers, three-dimensional accelerometers, inclinometers, thermometers, etc.

Figure 2:
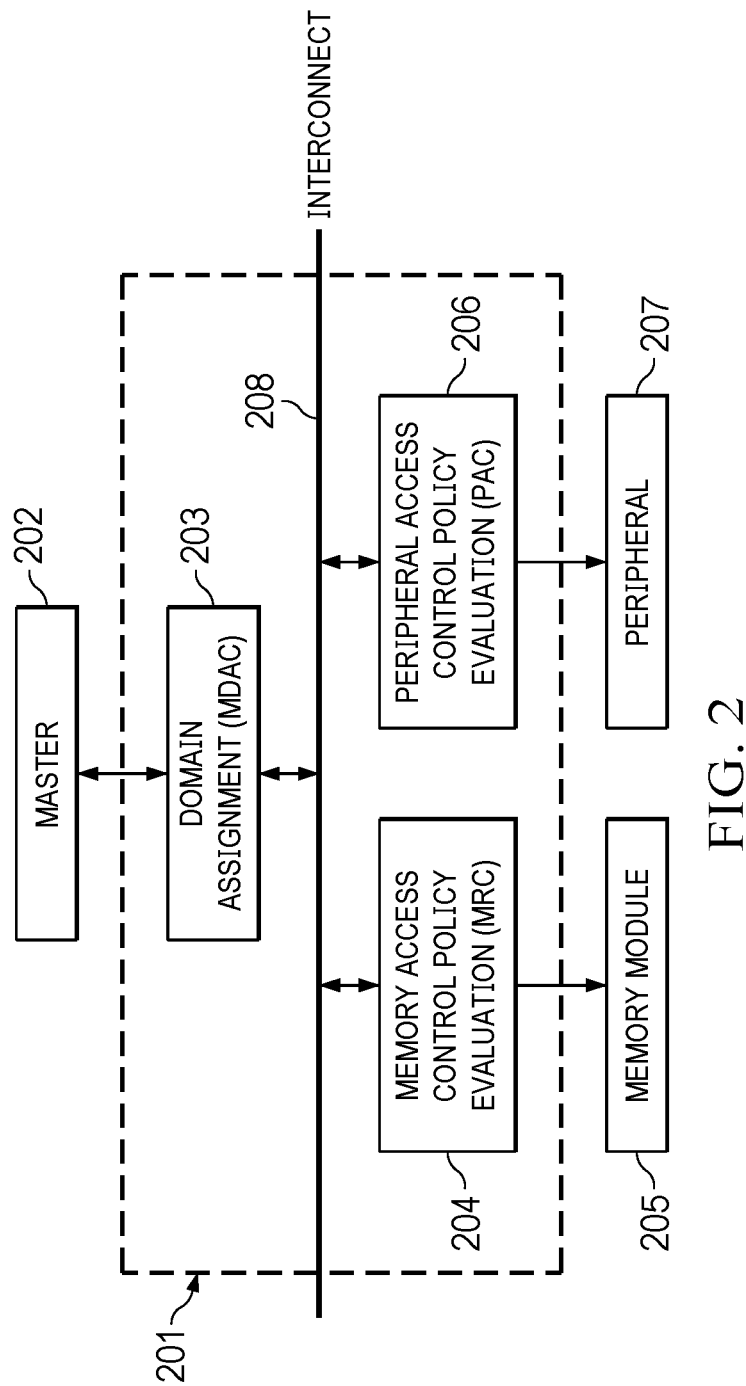
FIG. 2 is a block diagram of an example of an extended Resource Domain Controller (XRDC) implementable within a processing system, according to some embodiments.

FIG. 2 is a block diagram of an example of extended Resource Domain Controller (XRDC) 201 implementable within processing system 100. In various embodiments, XRDC 201 may include Master Domain Assignment Controller ("MDAC" or "MDA") 203, Memory Region Controller (MRC) 204, Peripheral Domain Access Controller ("PAC" or "PDAC") 206, and an XRDC Manager.

Generally, XRDC 201 may be configured to manage access control, system memory protection, and peripheral isolation. Moreover, XRDC 201 may allow software to assign chip resources (e.g., non-core bus masters, memory regions and slave peripherals) to domains. These domains may have a defined access control policy. Applications may co-exist on same silicon with static firewall between them.

A few example use-cases for XRDC 201 include: (a) isolating real time and non-real time application elements; (b) isolating safety critical and non-safety critical code; and (c) isolating cores running third party untrusted from cores running trusted code base.

In operation, XRDC 201 may manage access control from bus masters 202 to bus slaves, such as system memory modules 205 and peripherals 207, at least in part, by creating logically isolated partitions of memory 205 (and peripherals 207). Bus masters 202 may be similar to processing components 106-112 of master device 104, whereas memory modules 205 and peripherals 207 are examples of resources 130 in FIG. 1. Bus masters 202 attach to a domain, and bus slaves 205 and 207 may support region descriptors and access control, based on the domain of access.

MDAC 203 assigns programmed DIDs and other attributes to every bus transaction from its associated master 202, for example, based on a Master ID (fixed value per bus master), Process ID, secure or privilege bits, and the priority of the associated domain associated with the DID. Moreover, MDAC 203 transmits and receives transactions over interconnect 208.

MRC 204 performs memory region access control for memory module 205. MRC 204 also enforces memory region access control policies based on the DID, a privilege or user state of transaction, and a secure/non-secure state of transaction. MRC 204 may also use a priority associated with the domain of a transaction to order transactions for the memory module 205.

PAC 206 provides domain access control for all peripherals 207 connected to a single peripheral bus. PAC 206 enforces peripheral access control policies based on: the DID, the privilege or user state of a transaction, a secure/non-secure state of transaction. PAC 206 may also use a priority associated with the domain of the transaction to order transactions for the peripherals 207.

An XRDC Manager (MGR) submodule may coordinate programming model reads and writes. The MGR is usually not a programmable sub-module, but provides a register interface to the programming model.

Figure 3:
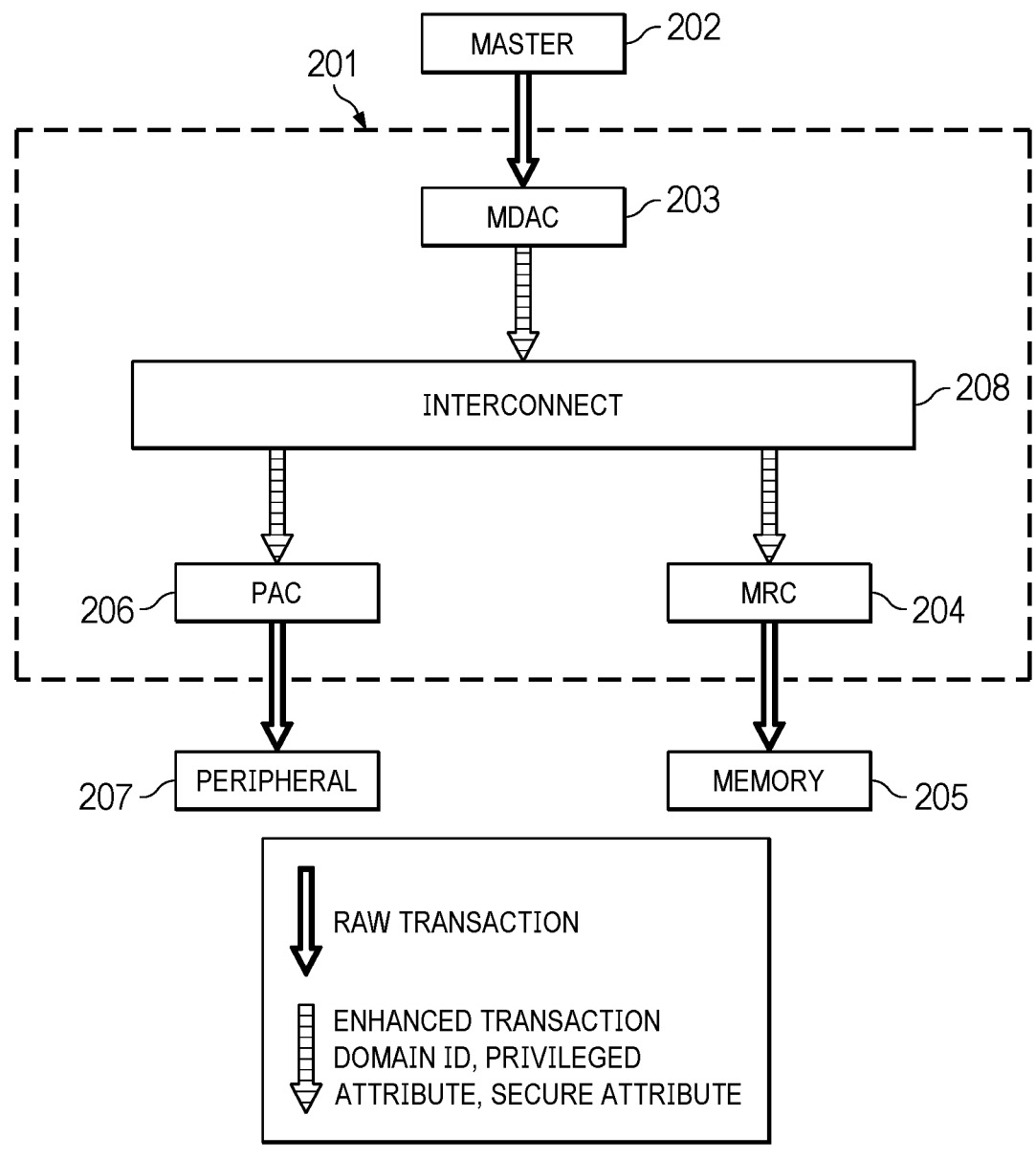
FIG. 3 is a block diagram that illustrates further details of the operation of the XRDC, according to some embodiments.

FIG. 3 is a block diagram that illustrates further details of the operation of XRDC 201 by way of an example message or transaction within processing system 100. First, master 202 associated with a particular domain, that has a particular DID, creates a raw transaction targeting either memory 205 or peripheral 207.

The raw transaction is provided to MDAC 203. At MDAC 203, XRDC information is added to the transaction, based on the programmed MDAC configuration to produce an enhanced transaction. The enhanced transaction with the DID, privileged attribute, and secure attribute is provided to interconnect 208.

The enhanced transaction is then provided from interconnect 208 to PAC 206 or MRC 204 based on the destination information in the transaction. PAC 206 or MRC 204 examines XRDC information in and determines if the access is allowed or not. If the access is not allowed, the transaction is blocked or aborted, and the XRDC information is captured in error registers. If the access is allowed, the XRDC information is removed from the enhanced transaction and the original raw transaction proceeds to memory 205 or peripheral 207.

Figure 4B:
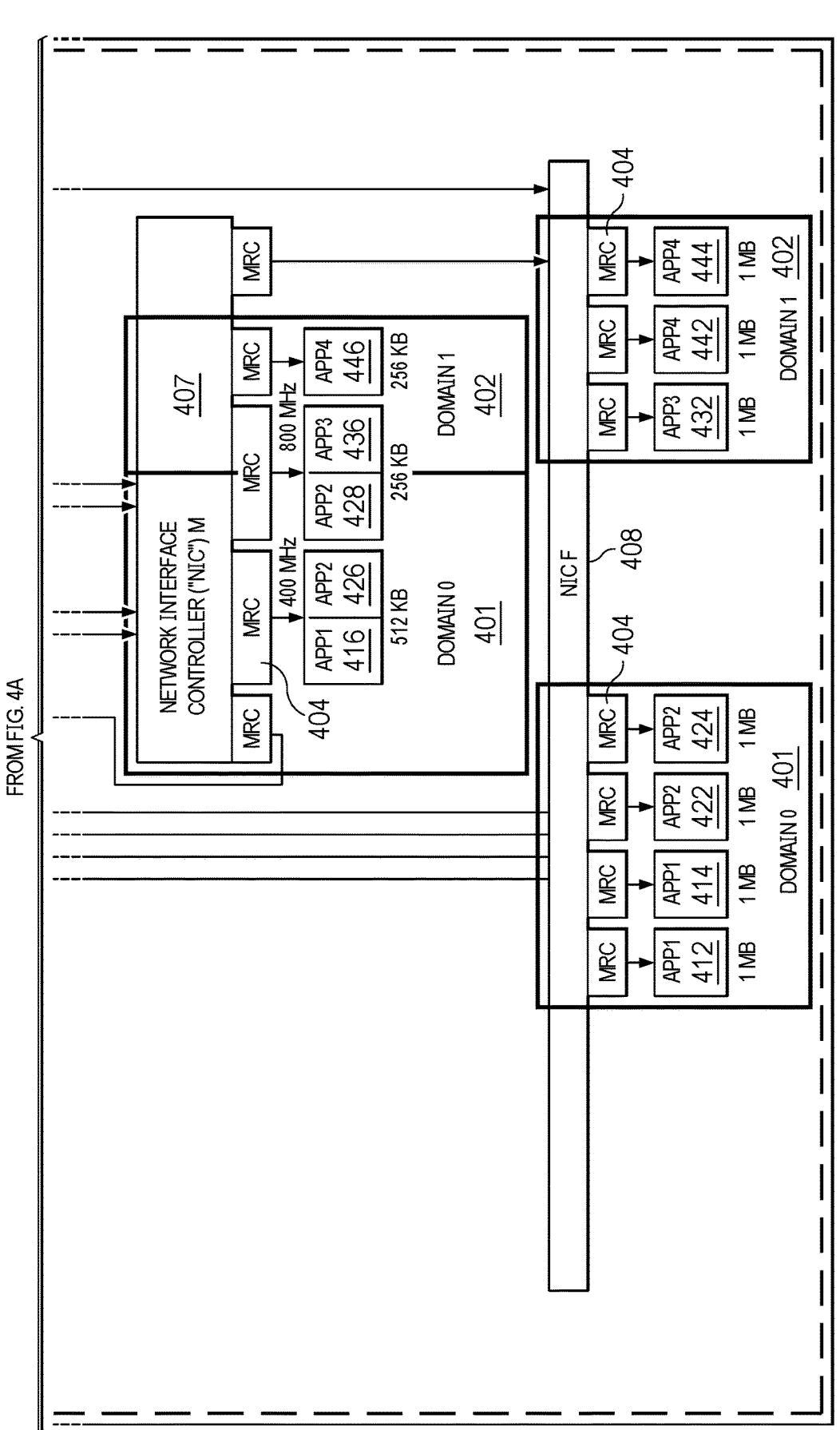

FIGS. 4A and 4B are block diagrams of an example of an SoC having components grouped into software-defined processing domains, for example, using XRDC 201. It should be noted that architectural features and implementation details may change from SoC to SoC; therefore, the particular SoC of FIGS. 4A and 4B should not be construed as limiting.

In this embodiment, each of domains 401 and 402 includes a processor core. Domain 401 includes processor "core 0," and domain 402 includes processor "core 1." In other embodiments, however, a different number of domains may be provided.

Each processor core may execute applications (or VMs) associated with its corresponding domain. For example, core 0 provides processing for applications 410 and 420, while core 1 provides processing for applications 430 and 440.

Each processor core may include an advanced single instruction multiple data architecture such as a NEON processor, or the like. Moreover, each processor core may have various sizes of Tightly Coupled Memory (TCM), Instruction Cache (I-Cache), and Data Cache (D-Cache) associated with it. Each processor core may also have a Microprocessor Unit (MPU), which may execute its associated applications.

Each processor core may also have a communication module that communicates with other parts of the SoC. For example, a Low Latency Peripheral Port (LLPP) may communicate with peripherals through a Network Interface Controller (NIC) for the peripherals. The NIC for peripherals may include Network Interface Controller P 406. These peripherals have one or more PACs 403 associated with them in order to perform XRDC operations.

As another example, Advanced extensible Interface (AXI) communication modules may facilitate communication between the processor cores and the memory. AXI is an on-chip communication bus protocol. For example, an AXIF module may communicate with memory in an F-bank through NIC F 408. As yet another example, an AXIM module may communicate with memory in an M-bank through Network Interface Controller M 407. Each of the memory NICs have one or more MRCs 404 associated with them in order to perform XRDC operations.

The M-bank of memory has memory assigned to the different applications in the different domains. Particularly, the M-bank has memory region or resource 416 associated with application 410, and memory regions 426 and 428 associated with application 420. Both memory region 416 and memory regions 426 and 428 are associated with domain 401. The M-bank also has memory regions 436 and 446 associated with application 430 and application 440, respectively. Both memory regions 436 and 446 are associated with domain 402.

In addition, the F-bank of memory also has memory assigned to the different applications in the different domains. Particularly, the F-bank has memory regions or resources 412 and 414 associated with application 410, and memory regions 422 and 424 associated with application 420. All of memory regions 412, 414, 422, and 424 are associated with domain 401. The F-bank also has memory region 432 associated with application 430 and memory regions 442 and 444 associated with application 440. All of memory regions 432, 442, and 444 are associated with domain 402.

In operation, when a transaction is initiated, the MPU checks the address and privilege level of a transaction at the core. However, outside of the core, the MPU plays no role in isolation and no further checks are completed. Without the XRDC, software running on the core must be trusted to only access its intended memory/peripherals. The XRDC, on the other hand, checks the attributes of a transaction at the memory/peripheral itself. The software running on cores no longer needs to be trusted; it may be firewalled within its own domain by the XRDC.

In this example, two applications (or VMs) are running on each core. If XRDC were disabled such that only the MPUs were enforcing isolation, and if the two MPUs were correctly configured, then the applications would only access their own memory resources. For example, application 410 would only access memory regions 412, 414, and 416. Application 420 would only access memory regions 422, 424, 426, and 428. Application 430 would only access memory regions 432 and 436. And application 440 would only access memory regions 442, 444, and 446. Any attempted violations do not leave the core and a data abort is generated.

Still referring to the same example, let us now assume that the MPU of Core 1 is incorrectly configured, such that application 430 is trying to access memory resource 416, for example. In this case, the incorrectly configured MPU allows the transaction to leave the core, and because there is no protection at the memory resource itself, memory resource 416 is compromised.

With XRDC enabled, however, memory resource 416 is not compromised. Although the incorrectly configured MPU still allows the transaction to leave the core, because MRC 404 now checks the transaction at the memory resource itself, the access is denied. In short, regardless of its MPU configuration, any software running on Core 1 cannot access any memory/peripheral assigned to domain 401.

In various embodiments, it may be desirable to ensure that a given software-defined processing domain does not consume excessive bandwidth on an SoC's bus (e.g., so that other transactions originated by other domains, such as safety-critical domains, do not stall). It may also be desirable to ensure that a software-defined processing domain does not consume excessive bandwidth of a peripheral or memory (e.g., to limit the impact of code stuck in a loop attempting to access a memory or peripheral repeatedly).

To address these, and other concerns, systems and methods described herein provide HiQoS. In various embodiments, HiQoS may be configured to selectively abort or block transactions (e.g., read or write commands) originating from specified processing domains before those transactions reach the SoC's bus. As such, HiQoS may guarantee (or attempt to guarantee), for example, that a particular domain does not use excessive bandwidth on the SoC's bus, or that another domain has full, unlimited access to the bus at a set point in time.

Because HiQoS, as described herein, is enforced at the hardware level, it is unburdened by the software overhead that would otherwise be associated with the use of a hypervisor. Moreover, even if an SoC's bus incorporates some level of bandwidth control on a per-core basis, HiQoS may still enable a finer granularity of control.

For instance, when using HiQoS, in the case of a VM running on a processing core that has its own unique DID, transactions may be controlled on a VM basis, rather than restricting all other VMs running on that core at the same time. Also, HiQoS allows for the control of transactions originating from non-core masters, such as Enhanced Direct Memory Access (eDMA) controllers or the like.

In some implementations, programmable registers may be added to an XRDC module's MDAC's register set to control the blocking of transactions from certain domains from progressing onto an SoC's bus. These transactions may either be blocked (or aborted) until manually unblocked again or blocked for a certain number of clock cycles.

Blocked or aborted transactions may return a bus fault to the bus master that generated the transaction, to which the bus master may respond accordingly (e.g., by repeating the transaction until the block is removed and a bus fault is not returned).

Another group of programmable registers may be added to the XRDC module's MRC's or PDAC's register set(s), which may count the number of transactions it receives for each available domain on the SoC. Each counter may also have a programmable threshold and generate an interrupt when that threshold is reached, along with a separate count-down timer that automatically resets the transaction counter at set intervals, thus preventing unwanted interrupts.

Figure 5A:
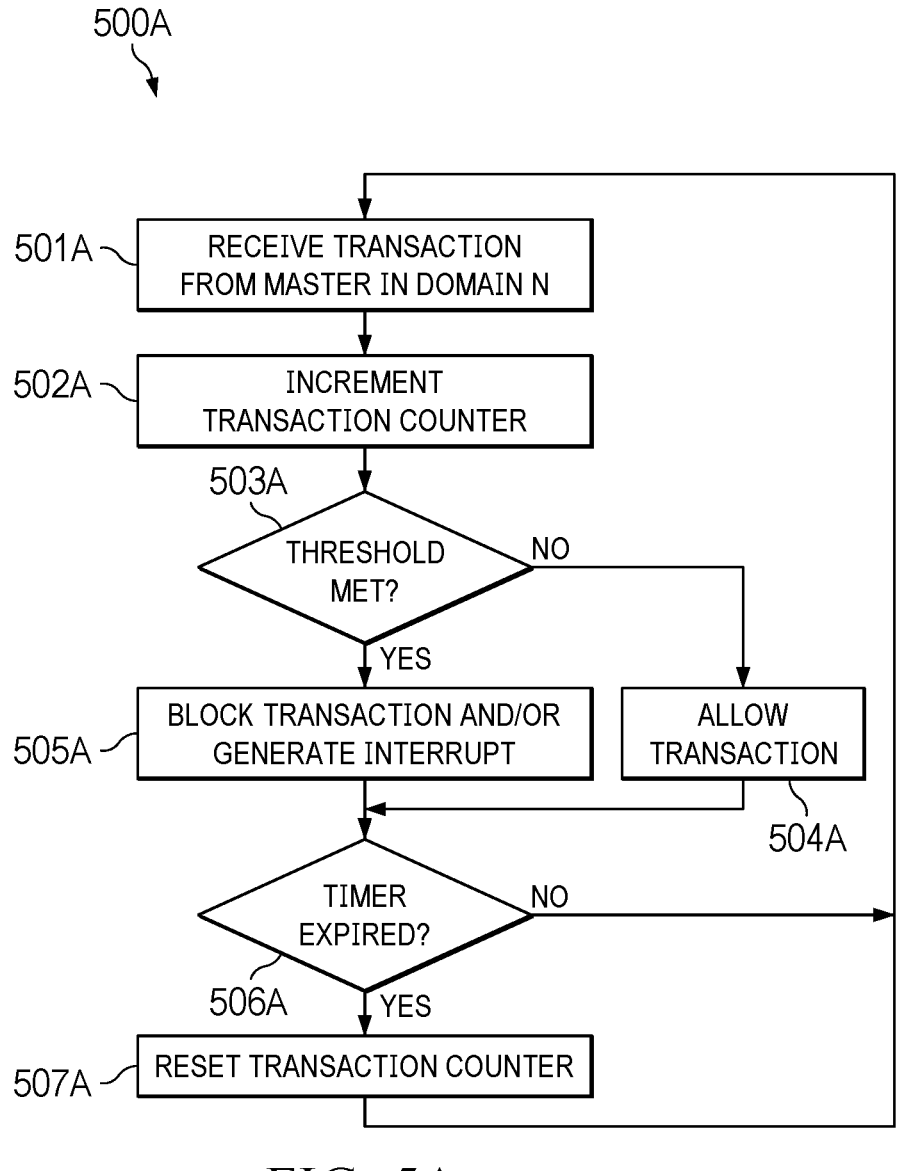
FIGS. 5A and 5B are flowcharts of examples of methods for providing Hardware integrated Quality of Service (HiQoS), according to some embodiments.
Figure 5B:
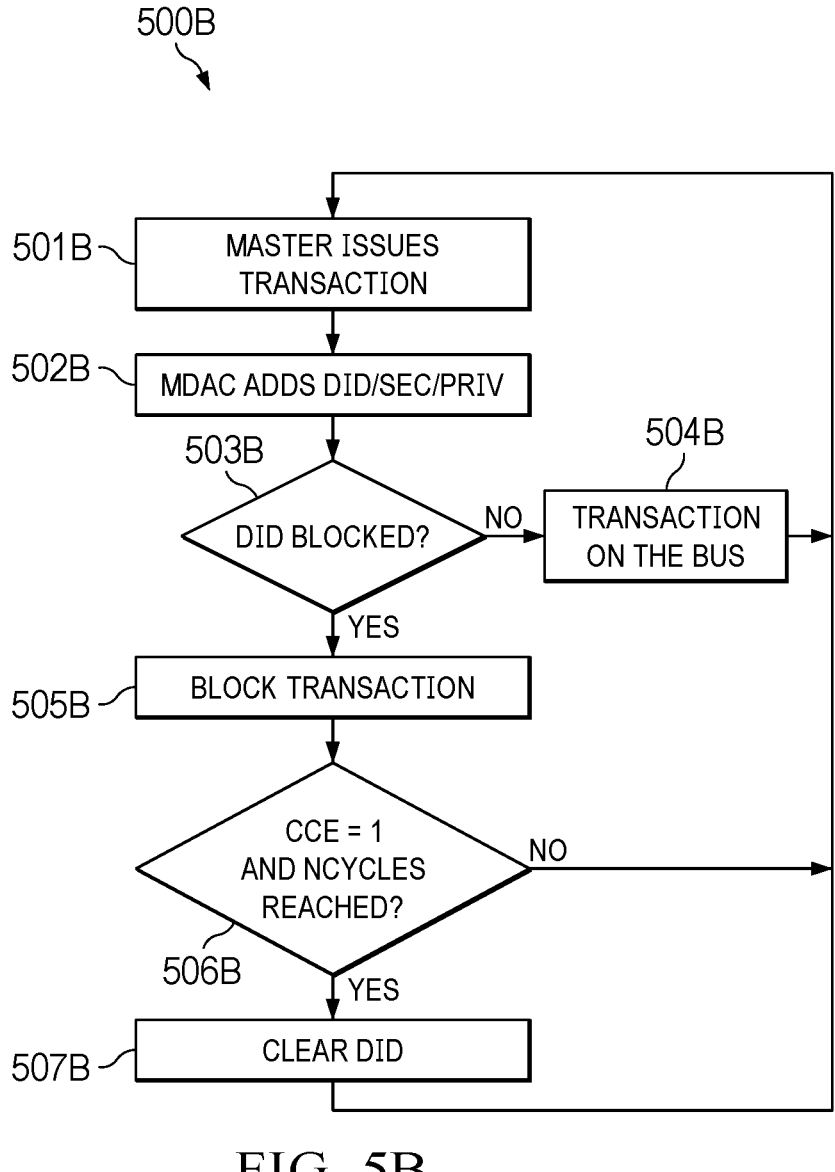

To illustrate the foregoing, FIGS. 5A and 5B are flowcharts of examples of methods 500A and 500B for providing HiQoS. In various embodiments, method 500A may be performed, at least in part, by MRC 204 or PDAC 206 of XRDC 201 shown in FIG. 2, using hardware described in connection with FIGS. 6-8.

Particularly, at 501A, method 500A of FIG. 5A includes receiving (e.g., at MDAC 203) a transaction (e.g., a read or write request) from a bus master (e.g., a processor core, a VM, etc.) associated with a given domain "N" (e.g., DID=N) targeting a bus slave (e.g., a memory, a peripheral, etc.).

At 502A, method 500A increments (e.g., by MRC 204 or PDAC 206) a transaction counter (e.g., registers 700B of FIG. 7B) associated with the given domain. At 503A, method 500A determines whether a selected transaction count value has been met for the given domain.

If the threshold is not met, at 504A method 500A allows the transaction to reach the SoC's interconnect. Conversely, if the threshold is met, at 505A method 500A aborts or otherwise blocks the transaction from reaching the SoC's interconnect (e.g., 208).

At 506A, if a timer or counter associated with the given domain the has not yet expired, control returns to 501A. On the other hand, if the timer or counter has expired, at 507A method 500A may reset the timer or transaction counter before control returns to 501A.

In summary, method 500A counts transactions that reach MRC 204 or PDAC 206 for each DID, and generates interrupts when a programmed threshold is reached. After an interrupt is set, MDAC 203 blocks transactions from corresponding domain(s) from progressing onto SoC bus or interconnect 208.

Meanwhile method 500B may be performed, at least in part, by MDAC 203 of XRDC 201, also using hardware described in connection with FIGS. 6-8. Particularly, at 501B, a master device (e.g., a processing core, etc.) issues a bus transaction (e.g., a memory or peripheral device command). At 502B, MDAC 203 adds a DID and other attributes (e.g., security, privilege, etc.) to the bus transaction.

At 503B, MDAC 203 determines if the DID is blocked. If not, at 504B MDAC 103 allows the bus transaction to reach bus or interconnect 208, and control returns to 501B. Otherwise, at 505B MDAC 103 blocks the transaction from reaching bus or interconnect 208.

At 506B, if a Cycle Counter Enable (CCE) register is not set (see FIG. 6B) or if a selected number of clock cycles to block transactions for (NCYCLES) has not been reached, control returns to 501B. However, if CCE is set and NCYCLES has been reached, at 507B MDAC 203 may clear the DID associated with the bus transaction before control returns to 501B.

Figure 6A:
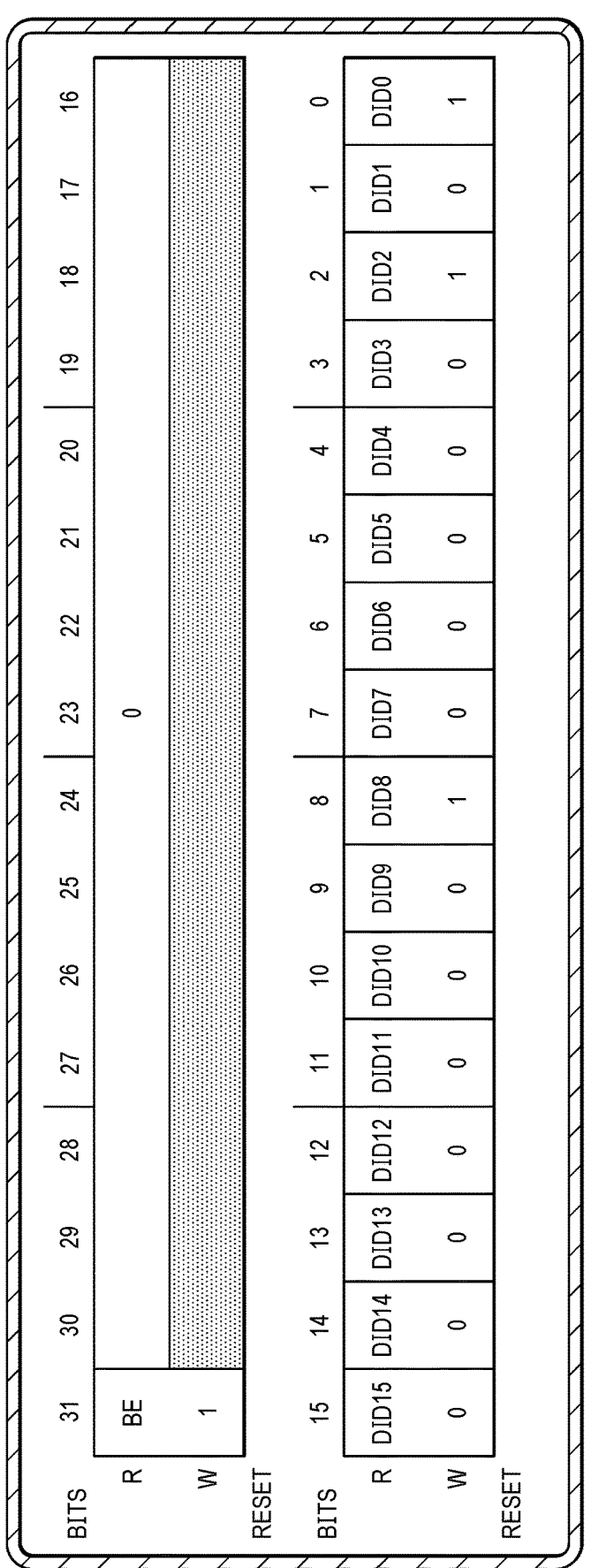
FIG. 6A is a block diagram of block enable registers added per Master Domain Processing Controller (MDAC), according to some embodiments.
Figure 6B:
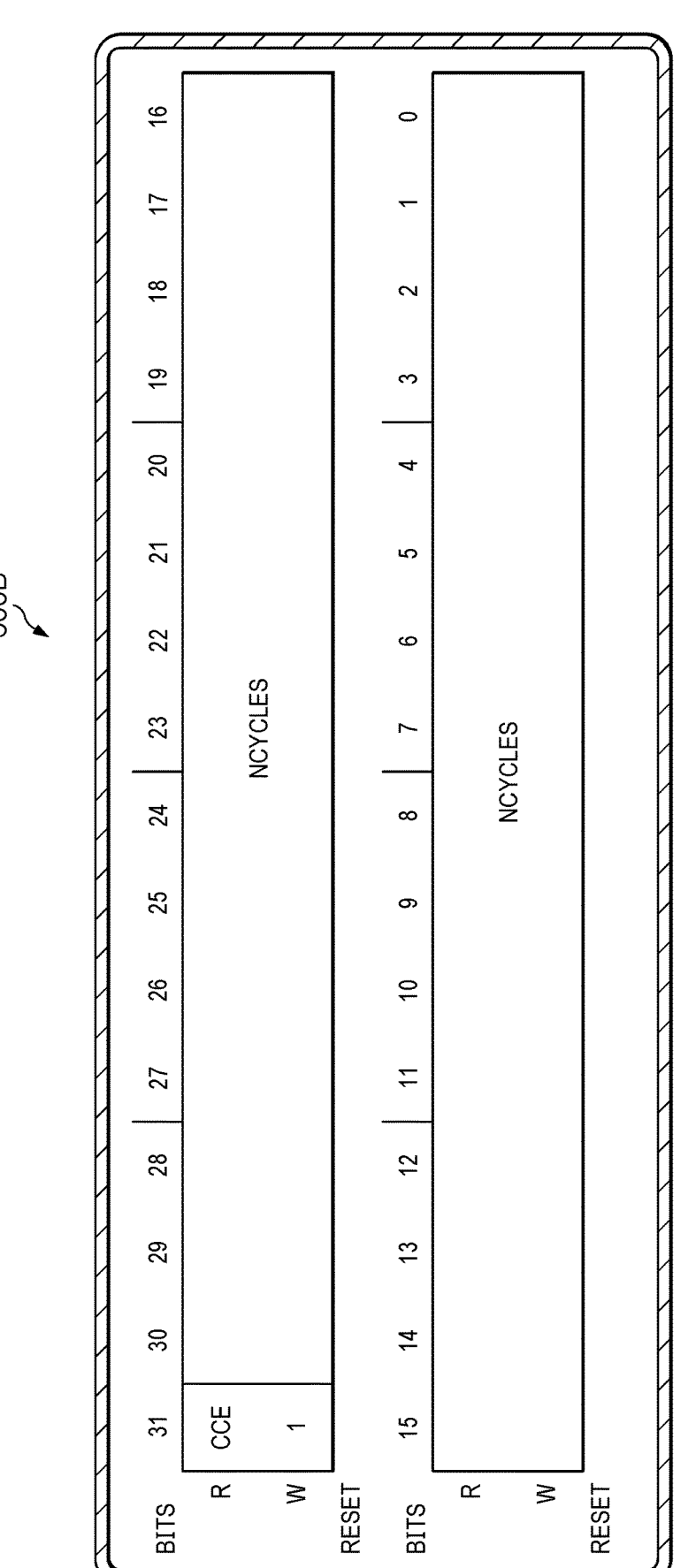
FIG. 6B is a block diagram of block cycle counter registers added per MDAC for each Domain IDentifier (DID), according to some embodiments.
Figure 7A:
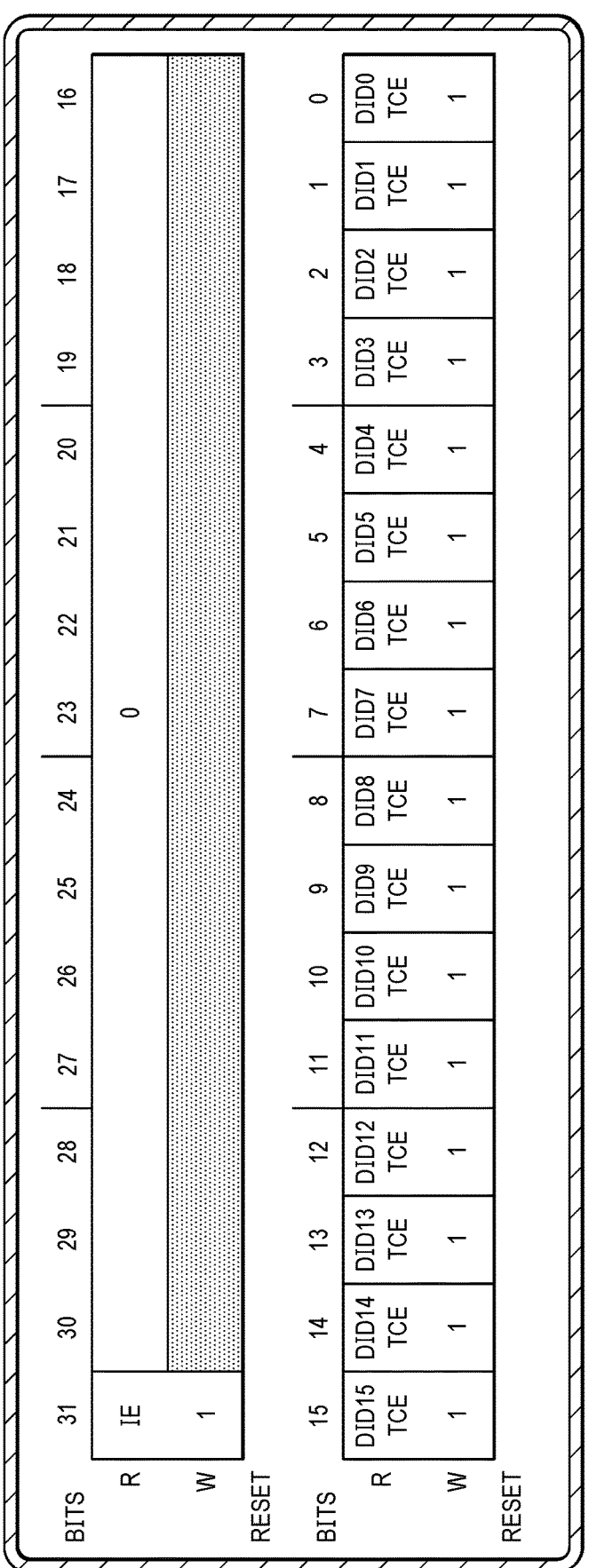
FIG. 7A is a block diagram of transaction counter enable registers added per Memory Region Controller (MRC) or Peripheral Domain Access Controller (PDAC), according to some embodiments.
Figure 7B:
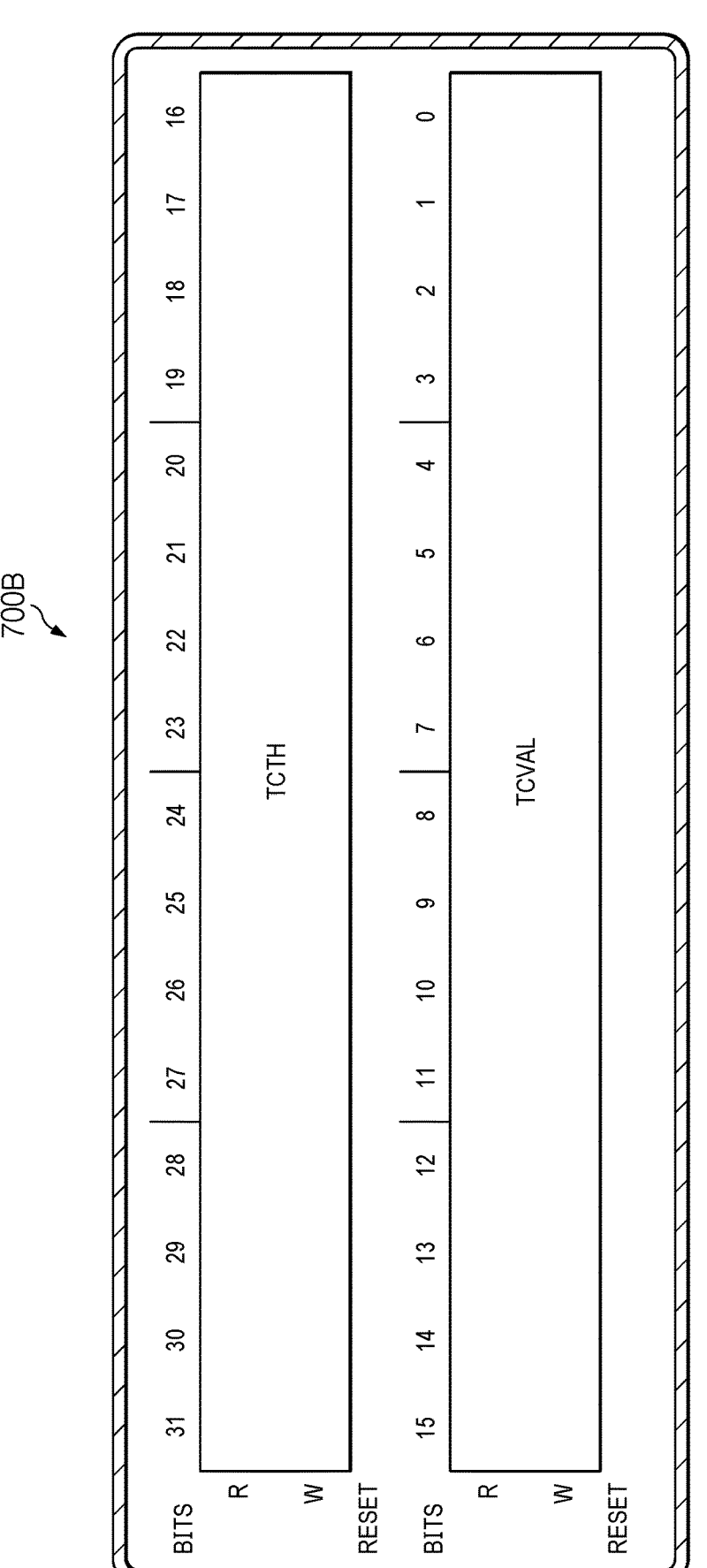
FIG. 7B is a block diagram of transaction counter registers added per MRC/PDAC for each DID, according to some embodiments.
Figure 8:
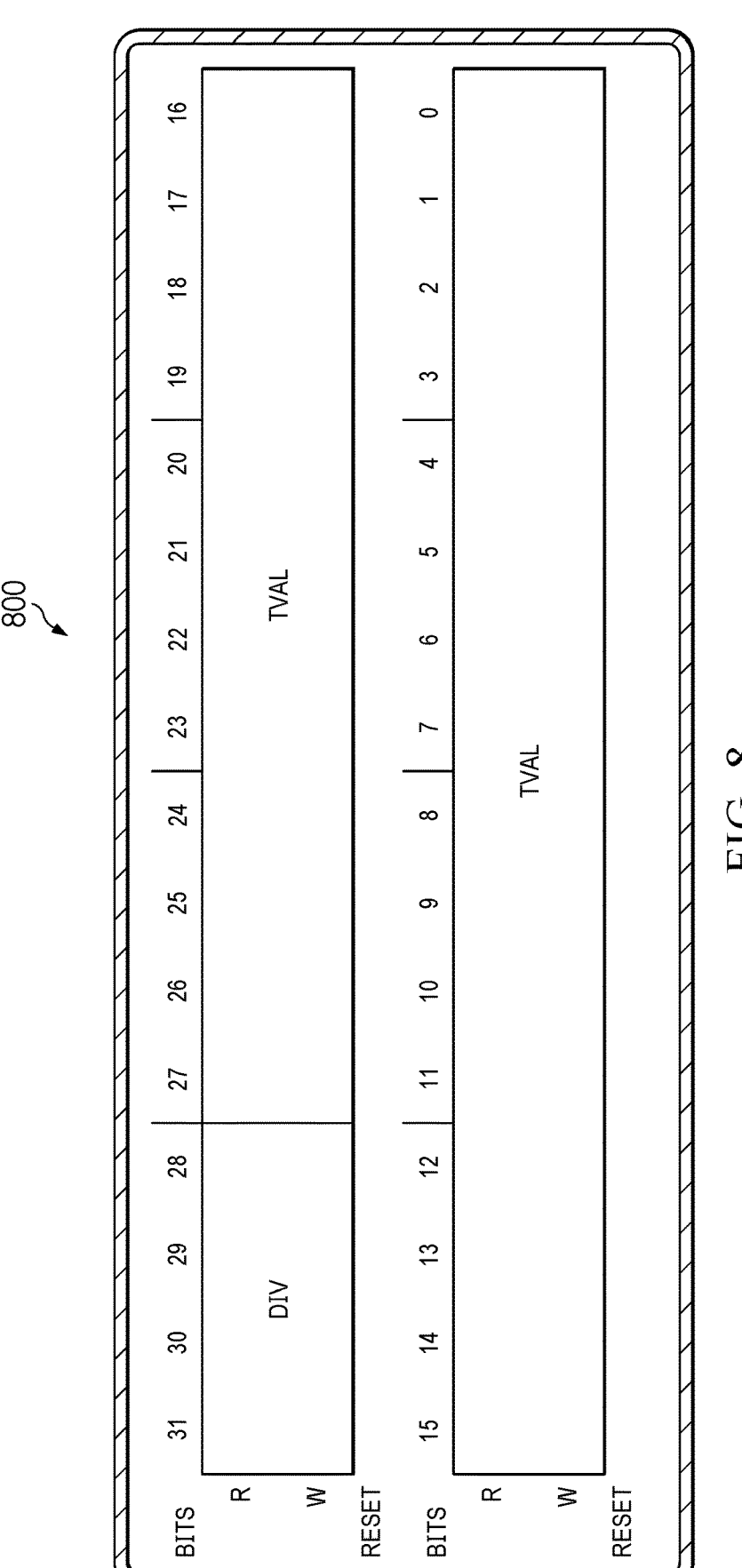
FIG. 8 is a block diagram of transaction counter reset registers added per MRC/PDAC for each transaction counter, one for each DID, according to some embodiments.

To implement methods 500A and 500B, FIG. 6A illustrates an example of Block Enable registers 600A added per MDAC 203, FIG. 6B illustrates an example of Block Cycle Counter registers 600B added per MDAC for each DID, FIG. 7A illustrates an example of Transaction Counter Enable registers 700A added per MRC 204 or PDAC 206, FIG. 7B illustrates an example of Block Cycle Counter registers 600B added per MRC 204 or PDAC 206 for each DID, and FIG. 8 illustrates an example of Transaction Counter Reset registers 800 added per MRC 204 or PDAC 206 for each Transaction Counter register, one for each DID.

Specifically, FIG. 6A shows Block Enable (BE) register 600A added per MDAC 203 register set. In this embodiment, there is one global block enable bit (e.g., 0=disabled and 1=enabled), and a bitfield for each Domain (e.g., 0=not blocked and 1=blocked). Although example 600A shows 31 DIDs, it should be noted that more or fewer registers may be used for different numbers of supported DIDs.

FIG. 6B shows Block Cycle Counter 600B added per MDAC 203 register set for each DID on the SoC. In this embodiment, there is one Cycle Counter Enable (CCE) bit (e.g., 0=disabled and 1=enabled), and a 31-bit value representing a selected number of cycles to block transactions for, which enables the automated unblocking of transactions for a DID after a certain number of clock cycles (NCYCLES).

FIG. 7A shows Transaction Counter Enable (TCE) register 700A added per MRC 204 or PDAC 206 register set. In this embodiment, there is one global Interrupt Enable (IE) bit (e.g., 0=disabled and 1=enabled), and a bitfield for each domain's TCE value (e.g., 0=disabled and 1=enabled) for 16 DIDs. Although example 700A shows 16 DIDs, it should be noted that more or fewer registers may be used for different numbers of supported DIDs.

FIG. 7B shows Transaction Counter 700B added per MRC 204 or PDAC 206 register set for each DID on the SoC. In this embodiment, there are 16 bits available to hold a Transaction Counter Threshold (TCTH) value and 16 bits available to hold a Transaction Counter VALue (TCVAL). In some cases, TCVAL may be manually cleared.

FIG. 8 shows Transaction Counter Reset registers 800 added per MRC 204 or PDAC 206 for each Transaction Counter register, one for each DID on the SoC. In this implementation, Transaction Counter Reset registers 800 include a 4-bit divider (DIV) and a 28-bit countdown timer configured to hold a Timer VAlue (TVAL).

Transaction Counter Reset registers 800 may be used to implement a timer that counts down from its programmed value. Once the timer value expires, the Transaction Counter register TCVAL field is reset to 0. In some cases, this feature removes the need for any manual intervention (e.g., from a System Manager or hypervisor) when clearing the counter at set time intervals to prevent unwanted interrupts.

Let us consider, for example, a first use case where a system manager programs MRC 204 for memory module 205 with a TCTH value of 128 for DID 2 (in registers 700B), enables Transaction Counter 700B and interrupt (in registers 700A), and programs the Transaction Counter Reset timer to expire every 5 ms (in registers 800).

If only 64 transactions from DID2 have been counted at MRC 204 when the 5 ms countdown timer expires, Transaction Counter 700B is reset, the 5 ms counter begins counting down again from its starting value, and no interrupt is sent to the system manager; therefore transactions are allowed (not blocked).

In contrast with the first use case, let us consider a second use case where a bandwidth violation does occur. In this second use case, the system manager again programs MRC 204 for memory module 205 with a TCTH value of 128 for DID 2 (in registers 700B), enables Transaction Counter 700B and interrupt (in registers 700A), and programs the Transaction Counter Reset timer to expire every 5 ms (in registers 800).

This time, however, when 128 transactions for DID2 have been counted within 5 ms at the MRC, an interrupt is sent to the system manager, which in response programs MDAC 203 (for master 202 responsible for issuing the DID2 transactions) to block all future transactions for DID2 for 256 clock cycles from entering bus or interconnect 208. The system manager may also manually reset the transaction counter and clear the interrupt. After 256 clock cycles have elapsed, MDAC 203 automatically unblocks DID2 transactions and resumes normal operation.

As such, systems and methods for HiQoS, as described here, may monitor the number of transactions reaching a memory or peripheral and may generate an interrupt when the programmed threshold has been reached. These systems and methods may also provide a built-in countdown timer to reset the transaction counter, thus removing the need for processor intervention when no violation is reported.

These systems and methods may further allow for the termination of transactions before they are placed on the SoC's bus, based on their processing domain, either for a set number of clock cycles, or indefinitely, until manually enabled again. Moreover, these systems and methods may further provide the ability to actively react to a bandwidth violation, at a hardware level, yet in a highly programmable manner.

In an illustrative, non-limiting embodiment, an electronic device may include a chassis and an SoC disposed within the chassis, where the SoC includes an XRDC configured to block a transaction originated from a selected one of a plurality of software-defined processing domains before the transaction reaches a bus.

For example, the transaction may include a memory read or write transaction. Additionally, or alternatively, the transaction may include a peripheral device command or message.

Each of the software-defined processing domains may include an MDAC. The MDAC may include block enable registers, and each block enable register may be configured to store a value that indicates whether to block transactions originated by a corresponding one of the plurality of software-defined processing domains.

The MDAC may also include block cycle counters. Each block cycle counter may be configured to store a value that indicates a number of clock cycles after which transactions are unblocked for a corresponding one of the plurality of software-defined processing domains.

The MDAC may further include transaction counter registers configured to store a number of transactions originated by each corresponding one of the plurality of software-defined processing domains. The transaction counter registers may be further configured to store a threshold number of transactions for each corresponding one of the plurality of software-defined processing domains.

In some cases, the XRDC may be configured to generate an interrupt in response to a stored number of transactions having reached or surpassed a threshold number of transactions for a corresponding one of the plurality of software-defined processing domains.

In some implementations, the electronic device may include a memory coupled to the bus via an MRC, where the MRC includes transaction counter enable registers, and where each transaction counter enable register is configured to store a value that indicates whether to count a number of transactions originated by a corresponding one of the plurality of software-defined processing domains.

The electronic device may also include a transaction counter reset register associated with the MRC, where the transaction counter reset register is configured to reset a stored number of transactions originated by the corresponding software-defined processing domain upon an expiration of a timer.

In other implementations, the electronic device may include a peripheral device coupled to the bus via a PDAC, where the PDAC includes transaction counter enable registers, and where each transaction counter enable register is configured to store a value that indicates whether to count a number of transactions originated by a corresponding one of the plurality of software-defined processing domains.

The electronic device may also include a transaction counter reset register associated with the PDAC, where the transaction counter reset register is configured to reset a stored number of transactions originated by the corresponding software-defined processing domain upon an expiration of a timer.

The XRDC may be configured to block the transaction originated from the selected software-defined processing domain, at least in part, in response to at least one of: (i) a determination that the selected software-defined processing domain is stuck in a loop, or (ii) a determination that another of the plurality of software-defined processing domains has full access to the bus.

In another illustrative, non-limiting embodiment, an SoC may include a bus master and an MDAC coupled to the bus master and to a switch fabric or crossbar, where the MDAC is configured to block a transaction originated from a selected one or more of a plurality of software-defined processing domains from reaching the switch fabric or crossbar, at least in part, in response to a number of transactions originated from the selected one or more software-defined processing domains having reached or surpassed a threshold value.

For instance, the master may include a processing core. The transaction may be blocked for a selected one or more of a plurality of VMs to the exclusion of a not selected one or more of the plurality of VMs.

In yet another illustrative, non-limiting embodiment, a method may include: counting, via one or more registers, a number of transactions issued by each of a plurality of software-defined processing domains targeting an MRC or PDAC; generating an interrupt in response to a number of transactions issued by a given one of the plurality of software-defined processing domains meeting a threshold number of transactions associated with the given software-defined domain; and in response to the interrupt, blocking, via an MDAC, a subsequent transaction issued by the given software-defined processing domain.

Blocking the subsequent transaction may include blocking the subsequent transaction before the subsequent transaction reaches an interconnect. Additionally, or alternatively, blocking the subsequent transaction may include blocking all transactions issued by the given software-defined processing domain for a number of clock cycles, and allowing transactions issued by the given software-defined processing domain after the selected number of clock cycles.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, Internet-of-Things (IoT) devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

For sake of brevity, conventional techniques have not been described in detail herein. Furthermore, the connecting lines shown in the various figures contained herein have been intended to illustrate relationships (e.g., logical) or physical couplings (e.g., electrical) between the various elements. It should be noted, however, that alternative relationships and connections may be used in other embodiments. Moreover, circuitry described herein may be implemented either in silicon or another semiconductor material or alternatively by software code representation thereof.

Although the invention(s) are described herein with reference to specific embodiments, various modifications and changes may be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An electronic device, comprising:
   a chassis; and
   a Systems-on-Chip (SoC) disposed within the chassis, wherein the SoC comprises an extended Resource Domain Controller (XRDC) configured to block a transaction originated from a selected one of a plurality of software-defined processing domains before the transaction reaches a bus.

2. The electronic device of claim 1, wherein the transaction comprises a memory read or write transaction.

3. The electronic device of claim 1, wherein the transaction comprises a peripheral device command or message.

4. The electronic device of claim 1, wherein each of the software-defined processing domains comprises a Master Domain Processing Controller (MDAC).

5. The electronic device of claim 4, wherein the MDAC comprises block enable registers, and wherein each block enable register is configured to store a value that indicates whether to block transactions originated by a corresponding one of the plurality of software-defined processing domains.

6. The electronic device of claim 4, wherein the MDAC comprises block cycle counters, and wherein each block cycle counter is configured to store a value that indicates a number of clock cycles after which transactions are unblocked for a corresponding one of the plurality of software-defined processing domains.

7. The electronic device of claim 4, wherein the MDAC comprises transaction counter registers configured to store a number of transactions originated by each corresponding one of the plurality of software-defined processing domains.

8. The electronic device of claim 7, wherein the transaction counter registers are further configured to store a threshold number of transactions for each corresponding one of the plurality of software-defined processing domains.

9. The electronic device of claim 8, wherein the XRDC is configured to generate an interrupt in response to a stored number of transactions having reached or surpassed a threshold number of transactions for a corresponding one of the plurality of software-defined processing domains.

10. The electronic device of claim 7, further comprising a memory coupled to the bus via a Memory Region Controller (MRC), wherein the MRC comprises transaction counter enable registers, and wherein each transaction counter enable register is configured to store a value that indicates whether to count a number of transactions originated by a corresponding one of the plurality of software-defined processing domains.

11. The electronic device of claim 10, further comprising a transaction counter reset register associated with the MRC, wherein the transaction counter reset register is configured to reset a stored number of transactions originated by the corresponding software-defined processing domain upon an expiration of a timer.

12. The electronic device of claim 7, further comprising a peripheral device coupled to the bus via a Peripheral Domain Access Controller (PDAC), wherein the PDAC comprises transaction counter enable registers, and wherein each transaction counter enable register is configured to store a value that indicates whether to count a number of transactions originated by a corresponding one of the plurality of software-defined processing domains.

13. The electronic device of claim 12, further comprising a transaction counter reset register associated with the PDAC, wherein the transaction counter reset register is configured to reset a stored number of transactions originated by the corresponding software-defined processing domain upon an expiration of a timer.

14. The electronic device of claim 1, wherein the XRDC is configured to block the transaction originated from the selected software-defined processing domain, at least in part, in response to at least one of: (i) a determination that the selected software-defined processing domain is stuck in a loop, or (ii) a determination that another of the plurality of software-defined processing domains has full access to the bus.

15. A System-on-Chip (SoC), comprising:
a bus master; and
a Master Domain Processing Controller (MDAC) coupled to the bus master and to a switch fabric or crossbar, wherein the MDAC is configured to block a transaction originated from a selected one or more of a plurality of software-defined processing domains from reaching the switch fabric or crossbar, at least in part, in response to a number of transactions originated from the selected one or more software-defined processing domains having reached or surpassed a threshold value.

16. The SoC of claim 15, wherein the master comprises a processing core.

17. The SoC of claim 15, wherein the transaction is blocked for a selected one or more of a plurality of Virtual Machines (VMs) to the exclusion of a not selected one or more of the plurality of VMs.

18. A method comprising:
counting, via one or more registers, a number of transactions issued by each of a plurality of software-defined processing domains targeting a Memory Region Controller (MRC) or Peripheral Domain Access Controller (PDAC);
generating an interrupt in response to a number of transactions issued by a given one of the plurality of software-defined processing domains meeting a threshold number of transactions associated with the given software-defined domain; and
in response to the interrupt, blocking, via a Master Domain Processing Controller (MDAC), a subsequent transaction issued by the given software-defined processing domain.

19. The method of claim 18, wherein blocking the subsequent transaction further comprises blocking the subsequent transaction before the subsequent transaction reaches an interconnect.

20. The method of claim 18, wherein blocking the subsequent transaction further comprises blocking all transactions issued by the given software-defined processing domain for a number of clock cycles, and allowing transactions issued by the given software-defined processing domain after the selected number of clock cycles.

* * * * *